United States Patent [19]
Krüger et al.

[11] Patent Number: 4,591,728
[45] Date of Patent: May 27, 1986

[54] TRANSFORMERLESS POWER UNIT

[75] Inventors: Tilmann Krüger, Neunkirchen; Werner Arnold; Leonhard Scheumann, both of Nuremberg, all of Fed. Rep. of Germany

[73] Assignee: Diehl GmbH & Co., Fed. Rep. of Germany

[21] Appl. No.: 587,377

[22] Filed: Mar. 8, 1984

[30] Foreign Application Priority Data

Mar. 17, 1983 [DE] Fed. Rep. of Germany ....... 3309529

[51] Int. Cl.⁴ ............................................. H02M 7/02
[52] U.S. Cl. ..................................... 307/75; 307/318; 323/230; 323/231; 363/126
[58] Field of Search ........................ 307/75, 72, 55, 52, 307/318, 317 R; 363/126; 323/229, 230, 231

[56] References Cited

U.S. PATENT DOCUMENTS 3,282,631 11/1966 Mosinski ............................. 307/318
4,095,163 6/1973 Montague ........................... 323/231

OTHER PUBLICATIONS

Smith *Design Focus*, Mar. 20, 1979, vol. 12, No. 6, p. 20.
*Shunt Regulators*, Trio Laboratories, 1968, 5204.

Primary Examiner—A. D. Pellinen
Assistant Examiner—T. DeBoer
Attorney, Agent, or Firm—Scully, Scott, Murphy & Presser

[57] ABSTRACT

A transformerless power unit for an electronic apparatus, preferably a horological instrument, including a fluorescent display, with a compensating resistor network which is connected with one pole of the supply voltage, preferably of a series circuit constituted of an ohmic impedance and a capacitor, with a rectifier diode, with a stabilizer for the stabilization of the output direct voltage, and with a charging capacitor which is connected in parallel with the output.

3 Claims, 1 Drawing Figure

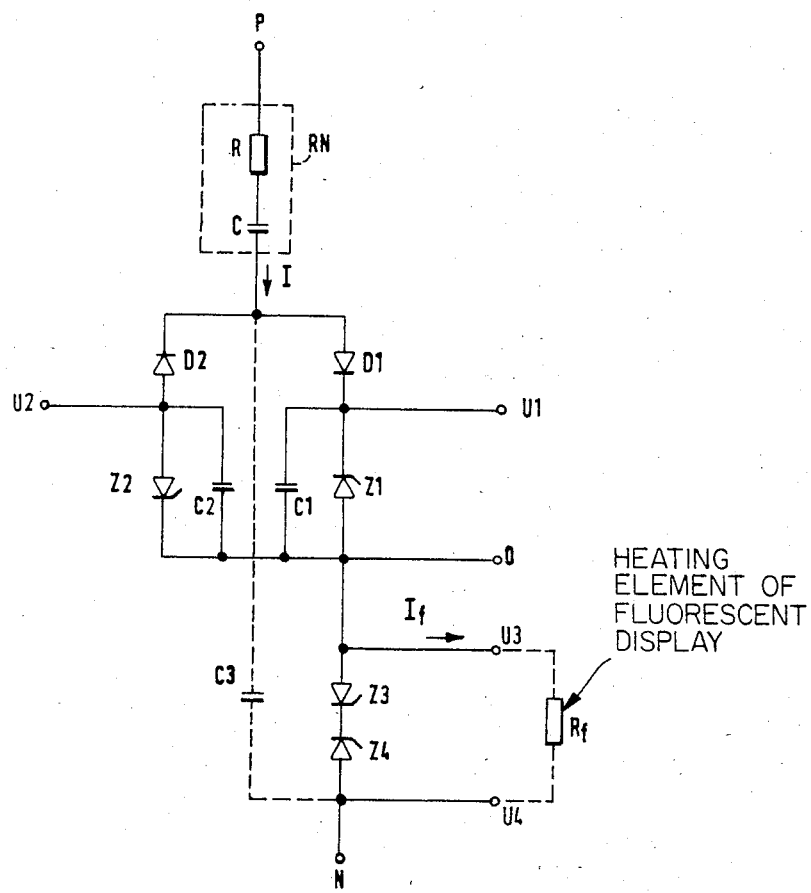

4,591,728

TRANSFORMERLESS POWER UNIT

BACKGROUND OF THE INVENTION

1. Field of the Invention

The present invention relates to a transformerless power unit for an electronic apparatus, preferably a horological instrument, including a fluorescent display, with a compensating resistor network which is connected with one pole of the supply voltage, preferably of a series circuit constituted of an ohmic impedance and a capacitor, with a rectifier diode, with a stabilizer for the stabilization of the output direct voltage, and with a charging capacitor which is connected in parallel with the output.

2. Discussion of the Prior Art

Power components of that type can be ascertained, for example, from the disclosure in the handbook "Circuit Examples With Discrete Semi-Conductor Components" (1972 Edition) of the company Intermetall, describing on pages 18 and 19, a stabilizing half-wave rectifier circuit which is operable without a power transformer. Herein, a compensating resistance circuit, which is constituted of a series circuit formed from an ohmic and a capacitive impedance, serves as a compensating resistance for a zener diode. The alternating current voltage present at the zener diode, and which is limited to the zener voltage, is rectified and smoothed through a rectifier diode and a charging capacitor. The zener diode has also a second function in this circuit besides the voltage limiting function (in the blocking direction); it serves in the passing direction for the closing of the alternating current path through the compensating resistor network; in essence, at least the same current flows through this diode as does through the electronic circuit connected thereto. That type of circuit is, accordingly, adapted for simple electronic circuits with a low current requirement, which necessitate only a single direct supply voltage.

SUMMARY OF THE INVENTION

In contrast therewith, it is an object of the present invention to provide a transformerless power unit which, with low circuit requirements, delivers two direct-current voltages, as well as an alternating-current voltage which is low relative to the power supply voltage.

In order to achieve the foregoing object pursuant to the invention, through the use of two rectifier diodes there are utilized both half-waves of the supply voltage for respectively generating an independent output direct current voltage with a common null point, wherein a capacitor and a zener diode are connected as voltage stabilizers in parallel with respectively the two direct-current voltage outputs, and that a low alternating-current voltage can be branched off intermediate the common null point and the second pole of the supply voltage for the heating of the fluorescent display.

A power unit of that type evidences a particular high degree of efficiency inasmuch as there are utilized both half-waves of the supply alternating-current voltage whereas in a usual transformerless power unit there is utilized only one half-wave, whereas the second, however, leads to thermal losses in the compensating resistor network. For the same power output, by means of the inventive power unit there can be increased the value of the compensating resistance network; in essence, with the preferably utilized combination consisting of an ohmic impedence and capacitor, the capacitance of the capacitor can be reduced (to a value of less than $1/\sqrt{2}$) In addition to the obtained space savings, there is achieved a manufacturing cost reduction inasmuch as, for capacitors of this type, for reasons of safety there must be employed extremely expensive construction.

Due to the possibility of the asymmetrical delivery of the two generated direct voltages relative to the common null point, an electronic circuit which is connected thereto can be designed with the minimum consumption requirements. When the negative of the two output voltages is raised to a value which is higher than the amount of the peak value of the alternating-current voltage for the heating of the fluorescent display, then it is possible to obtain a completely dimmed control over the numerals or segments of the fluorescent display without any difficulties also during multiplex operation.

Through the utilization of two zener diodes which are connected oppositely and in series, and which are connected in parallel with the alternating-current voltage output of the power unit, there is assuredly avoided any presence of excess voltages at the heating of the fluorescent display.

Due to the rapid response of zener diodes even within the high frequencied range, in particular transient power supply disruptions are held remote from the circuit.

An additional capacitor which is connected intermediate the second pole of the supply voltage and a circuit point which is between the compensating resistor circuit and the rectifier diodes, serves in an advantageous manner to prevent any additional disturbances of the circuit.

Due to the relative high-ohmic condition of the circuit in the here already low voltage present, there can be employed capacitors herein with low capacitance and voltage disruptive strength.

BRIEF DESCRIPTION OF THE DRAWING

Reference may now be had to the following detailed description of the invention, taken in conjunction with the accompanying single FIGURE of drawing, in which there is illustrated a preferred embodiment of a transformerless power unit.

DETAILED DESCRIPTION

The transformerless power unit includes a resistor network RN which is connected to one pole P of the supply voltage; for permanently installed appliances with this power unit this is preferably the phase. The resistor network RN preferably consists of an ohmic impedance R for limiting the switch-on current surges, and of a capacitor C as a capacitive reactive impedance connected in a series circuit. Connected with the compensating resistance circuit RN are two rectifier diodes D1, D2, in which the rectifier diode D1 is connected with the anode and the rectifier diode D2 with the cathode. In correspondence therewith, through the rectifier D1 there flows only the positive half-wave, and through the D2 only the negative half-wave of the alternating current. The other electrode of the two rectifier diodes D1 and D2 are presently connected with a charging capacitor C1, C2 and with a zener diode Z1, Z2. Hereby, the cathode of the zener diode Z1 is connected with the anode of the rectifier diode D1, and the anode of the zener diode D2 is connected with the cathode of the rectifier diode D2.

These two connecting points concurrently represent the outputs U1, U2 for two direct-current voltages of opposite polarity. The remaining terminals of the zener diodes Z1, Z2 and the charging capacitors Z1, Z2 are connected with each other and form the output 0 of the power unit. The voltage which is obtained between the outputs U1 and 0, or U2 and 0, is equal to the selected zener voltage of the zener diodes Z1 or Z2. Through a respective utilization of the zener diodes Z1, Z2 there can thus be achieved asymmetrical voltage relationships at the two outputs U1, U2 such as, for example, $-12$ V and $+5$ V.

Directly connected with the output 0 is a further output U3. A last output U4 is directly connected with the second pole N of the supply voltage. In order to complete the power unit circuit, the outputs U3, U4 at which there is obtained an alternating-current voltage, and which are closed off by an impedance or the like, in the drawing figure there is illustrated by means of a resistor symbol $R_f$. When the power unit is inventively employed, then there is connected with the outputs U3, U4 the heating filament of a fluorescent display.

Preferably, connected in parallel with the outputs U3, U4 is a series circuit consisting of two oppositely-connected zener diodes Z3, Z4 with approximately equal zener voltage. These zener diodes Z3, Z4 serve for the shunting of particularly transient power supply disturbances at the heating filament of the fluorescent display and, if necessary, also for limiting the alternating-current voltage present at the heating filament. Preferably, the zener diodes Z3, Z4 are so dimensioned that their zener voltage is equal to the maximum allowable operating voltage for the heating filament of the fluorescent display.

Furthermore, for negating high-frequencied power supply disturbances, a capacitor C3 with a low capacitance can be connected intermediate the second pole N of the supply voltage, or the output U4, and a circuit point between the compensating resistance network RN and the rectifier diodes D1, D2.

Preferably, the power unit is so sized, that the alternating-current voltage which is present between the outputs U3 and U4 during normal operating conditions is equal to or slightly lower than the zener voltage of the zener diodes Z3, Z4. Thereby the total current I which flows through the power unit is substantially equal to the current $I_f$ flowing through the heating filament of the fluorescent display; the sum of the currents which flow through the outputs U1, U2 must then be less than the current $I_f$. Due to this measure, the heating filament is heated with an almost symmetrical full-wave alternating-current voltage, which enhances the service life of the heating filament. The operating voltage which is necessary for heating filaments of that type lies, as a rule, at values of 12 V (effective value); preferably at 3 V; in effect, is by one to two magnitudes lower than the supply voltage.

Furthermore, through suitable sizing of the zener diode Z2 it is possible to obtain a negative voltage at the output U2 whose amount, relative to the output 0, is higher than the peak voltage of the operating voltage which is present at the heating filament of the fluorescent display. This voltage (at output U2) can then be utilized for the purpose of controlling the anode and grid of the fluorescent display. Because of this measure, it is possible to obtain a completely dimmed control over unnecessary display components, particularly also during multiplex operation.

What is claimed is:

1. In a transformerless power circuit having two direct current voltage outputs and an alternating current voltage output for heating a filament of a fluorescent display of an electronic appliance; said circuit comprising:
    compensating resistance network connected to one pole of a supply voltage, said compensating resistance network including a series circuit of a resistor and a capacitor;
    two oppositely poled rectifier diodes each connected to the output of the compensating resistance network utilizing both half-waves of the supply voltage, each of said diodes respectively generating one independent direct-current output voltage with a common null point;
    a capacitor and a zener diode forming a voltage stabilizer connected in parallel with respectively each of the two direct-current voltage outputs between the rectifier diodes and the common null point;
    two oppositely poled, series-connected zener diodes connected between the common null point and a second pole of the supply voltage; and
    an alternating-current voltage output formed by two output terminals branched off between the common null point and the second pole of the supply voltage in parallel with the series connected zener diodes, the zener voltage being equal or lower than the maximum allowable voltage for heating the filament of the fluorescent display.

2. Transformerless power unit as claimed in claim 1, wherein said two zener diodes provide differing zener voltages, one direct-current output voltage evidencing a negative value relative to the common null point, whose amount is higher than the maximum peak value of the alternating-current voltage for the heating of the fluorescent display.

3. Transformerless power unit as claimed in claim 1, wherein a further capacitor is connected intermediate the second pole of the supply voltage and a circuit point between the compensating resistor network and the rectifier diodes, for discharging high-frequencied disturbances through said capacitor.

* * * * *